(12) United States Patent
Toda et al.

(10) Patent No.: US 8,202,074 B2
(45) Date of Patent: Jun. 19, 2012

(54) IN-MOLD MOLDED PRODUCT COATING MOLD AND IN-MOLD MOLDED PRODUCT COATING FORMING METHOD

(75) Inventors: Kenichi Toda, Aichi (JP); Noriyuki Kano, Aichi (JP)

(73) Assignee: KraussMaffei Technologies GmbH, Munich (DE)

( * ) Notice: Subject to any disclaimer, the term of this patent is extended or adjusted under 35 U.S.C. 154(b) by 113 days.

(21) Appl. No.: 12/921,297

(22) PCT Filed: Mar. 6, 2009

(86) PCT No.: PCT/EP2009/052658
§ 371 (c)(1),
(2), (4) Date: Sep. 7, 2010

(87) PCT Pub. No.: WO2009/112433
PCT Pub. Date: Sep. 17, 2009

(65) Prior Publication Data
US 2011/0018165 A1 Jan. 27, 2011

(30) Foreign Application Priority Data
Mar. 14, 2008 (JP) ................................. 2008-065421

(51) Int. Cl.
*B29C 41/20* (2006.01)
*B29C 41/38* (2006.01)
*B29C 45/14* (2006.01)
*B29C 45/16* (2006.01)
*B29C 45/26* (2006.01)

(52) U.S. Cl. ......... 425/95; 425/96; 425/127; 425/129.1; 264/255; 264/328.7

(58) Field of Classification Search .................. None
See application file for complete search history.

(56) References Cited

U.S. PATENT DOCUMENTS

| 4,004,868 | A | * | 1/1977 | Ohdate | .......................... | 425/130 |
| 4,840,760 | A | * | 6/1989 | Oishi | .......................... | 264/245 |
| 6,756,004 | B2 | * | 6/2004 | Davis et al. | .................. | 264/255 |
| 7,108,825 | B2 | * | 9/2006 | Dry et al. | .................. | 264/328.7 |

(Continued)

FOREIGN PATENT DOCUMENTS
JP 2002-127198 * 5/2002
(Continued)

*Primary Examiner* — Edmund H. Lee
(74) *Attorney, Agent, or Firm* — Henry M. Feiereisen; Ursula B. Day

(57) ABSTRACT

An in-mold molded product coating mold includes a sealing portion molding cavity being positioned outside apart from a mold cavity while including a first molding surface which extends from a parting surface of the mold cavity in a mold mating direction of a stationary mold and a movable mold and is formed at either one of the stationary mold and the movable mold. A second molding surface extends from the parting surface in a mold opening/closing direction of the mold cavity and is formed at the other of the above-described two molds. A third molding surface connects the first molding surface and the second molding surface to each other, and forms a sealing portion for sealing the first and second molding surfaces by filling a resin identical to or different from a resin. Pressers are provided for pressing a pressing surface of the sealing portion defined by the third molding surface under a predetermined pressure, so as to bring the sealing portion into press-contact with the first and second molding surfaces, respectively.

12 Claims, 10 Drawing Sheets

U.S. PATENT DOCUMENTS

| | | | |
|---|---|---|---|
| 7,309,221 B2 * | 12/2007 | Okahara et al. | 425/112 |
| 7,459,114 B2 * | 12/2008 | Hyuga et al. | 264/255 |
| 7,670,524 B2 * | 3/2010 | Schoemann et al. | 264/255 |
| 7,799,259 B2 * | 9/2010 | Sawada et al. | 264/328.7 |
| 7,832,999 B2 * | 11/2010 | Yonemochi et al. | 425/130 |
| 7,837,917 B2 * | 11/2010 | Polk, Jr. | 264/255 |
| 7,837,918 B2 * | 11/2010 | Yonemochi et al. | 264/255 |
| 2002/0194701 A1 * | 12/2002 | Benda | 16/2.1 |
| 2003/0218272 A1 * | 11/2003 | Sekito et al. | 264/255 |
| 2004/0201132 A1 | 10/2004 | Okahara et al. | |
| 2006/0076712 A1 * | 4/2006 | Yonemochi et al. | 264/255 |

FOREIGN PATENT DOCUMENTS

| | | | |
|---|---|---|---|
| JP | 2002-137255 | * | 5/2002 |
| JP | 2002127199 | * | 5/2002 |
| JP | 2002 172657 | | 6/2002 |
| JP | 2002172657 | * | 6/2002 |
| JP | 2004 223943 | | 8/2004 |
| JP | 3617807 | | 11/2004 |
| JP | 2005288739 | * | 10/2005 |
| JP | 3820332 | | 6/2006 |
| JP | 3843833 | | 8/2006 |
| JP | 2006 256088 | | 9/2006 |

* cited by examiner

IN-MOLD MOLDED PRODUCT COATING MOLD AND IN-MOLD MOLDED PRODUCT COATING FORMING METHOD

CROSS-REFERENCES TO RELATED APPLICATIONS

This application is the U.S. National Stage of International Application No. PCT/EP2009/052658, filed Mar. 6, 2009, which designated the United States and has been published as International Publication No. WO 2009/112433 A1 and which claims the priority of Japanese Patent Application, Serial No. 2008-065421, filed Mar. 14, 2008, pursuant to 35 U.S.C. 119(a)-(d).

BACKGROUND OF THE INVENTION

The present invention relates to an in-mold molded product coating mold, in which a surface of a molded resin product molded inside of a mold is coated by injecting and hardening a coating agent serving as a fluid having a viscosity lower than that of a molten resin, and an in-mold molded product coating forming method.

For example, Patent Document 1 discloses an in-mold coating mold, in which a coating agent is injected between a surface of a molded resin product molded inside of a mold and a mold cavity, before a molded product having the coating agent integrated in close contact with the surface of the molded resin product is obtained by hardening the coating agent inside of the mold.

In the in-mold coating mold disclosed in Patent Document 1, over the entire periphery of a main cavity are provided a sub cavity constituting a part of a back surface of the main cavity, a movable core which advances or retreats inside of the sub cavity inside of a peripheral portion on a side opposite to a coated surface side of the sub cavity, and a high temperature portion at a position facing the movable core.

In the in-mold coating mold disclosed in Patent Document 1, the movable core can firmly press the vicinity of the peripheral portion of the sub cavity of the molded resin product against a mold sub cavity surface. As a consequence, in the in-mold coating mold disclosed in Patent Document 1, no coating agent (i.e., no paint) can leak outside of a portion at which the vicinity of the peripheral portion of the sub cavity of the molded resin product is pressed against the mold sub cavity surface.

Furthermore, in the in-mold coating mold disclosed in Patent Document 1, the high temperature portion is disposed at the position facing the movable core of the sub cavity, so that the coating agent (i.e., the paint) can be instantaneously hardened. Consequently, in the in-mold coating mold disclosed in Patent Document 1, it is possible to securely prevent any leakage of the coating agent (i.e., the paint) outward of the mold.

Incidentally, Patent Documents 2 to 5 disclose a method for obtaining a molded product having a coating agent integrated in close contact with a surface of a molded resin product.

[Patent Document 1] JP Laid-open Patent Application Publication No. 2002-172657
[Patent Document 2] JP Patent Publication No. 3843833
[Patent Document 3] JP Patent Publication No. 3820332
[Patent Document 4] JP Patent Publication No. 3617807
[Patent Document 5] JP Laid-open Patent Application Publication No. 2006-256088

DISCLOSURE OF THE INVENTION

[Problem to be Solved by the Invention]

The technique disclosed in Patent Document 1 prevents any leakage of the coating agent (i.e., the paint) outward of the portion since the movable core disposed inside of the peripheral portion on the side opposite to the coated surface side of the sub cavity presses the vicinity of the inside of the peripheral portion on the coated surface side of the sub cavity of the molded resin product against the mold sub cavity surface.

However, in the technique disclosed in Patent Document 1, the sub cavity and a part of the back surface of the main cavity are molded integrally with each other over the entire periphery of the main cavity of the molded resin product. When the coating agent is injected by finely opening the mold, the main cavity of the molded resin product is pressed against the mold cavity surface on the side opposite to the coated surface side under a coating agent injection pressure or a mold cavity inner pressure generated by a mold clamping repeat operation thereafter. In contrast, the sub cavity is pressed against the mold sub cavity surface on the side of the coated surface by the movable core.

In view of this, in the technique disclosed in Patent Document 1, the main cavity and the sub cavity are pressed in directions reverse to each other with deformation between the main cavity and the sub cavity in the integrated molded resin product. In this way, undue force (i.e., a stress) is exerted on the main cavity as a product, thereby inducing a cause for concern about deformation of the product. Furthermore, regarding the sub cavity, deformation ranging from the main cavity, injection of the coating agent and the inner pressure during the mold clamping repeat operation influence sealability (i.e., pressing force) to prevent the outward leakage of the coating agent, which is an original object, thereby inducing a concern about inaccurate formation of the product.

In order to eliminate these causes for concern, there also is disclosed formation of a thin-walled portion inside of the sub cavity. However, such a thin-walled portion must be strong enough not to be broken even in the case of exertion of deformation or pressure, and therefore, may produce a limitative effect.

In addition, in the technique disclosed in Patent Document 1, as a matter of course, the coating agent cannot be injected to the back side of the main cavity integrated with the sub cavity (i.e., the mold cavity surface on the side opposite to the coated surface side), and further, complication or a high accuracy is required for a next process for cutting the sub cavity in conformity with the shape of the product.

For example, in the case where a final product is mounted on a separate part, the uncoated surface cut in the next process becomes visible through a slight clearance between a coated product surface and the separate part, thereby raising a problem from the viewpoint of a design of outside appearance, which restricts a fixing method per se. A subject has been conventionally raised that if the coating agent can be somewhat injected toward the side opposite to the coated surface side, the restriction can be eliminated.

In the Prior Art typified by Patent Documents 2, 3 and 5 other than that disclosed in Patent Document 1, there is provided no presser, and therefore, the sealability depends upon the shape of the sub cavity. Every time different types of resins or coating agents that have different viscosities are used, there raises a cause of concern that dimensions of shapes need be studied by trial and error. Moreover, the sealability caused by the shape is uncertain, since it may not be partly uniform or the shape may be varied over time in mass production.

SUMMARY OF THE INVENTION

The present invention has been accomplished in view of the above-described circumstances. Therefore, an object of the present invention is to provide an in-mold molded product coating mold and an in-mold molded product coating forming method, in which sealability can be enhanced to a secure level for preventing any leakage of a coating agent outside of a mold while preventing any occurrence of deformation of a molded resin product. Additionally, an object of the present invention is to provide an in-mold molded product coating mold and an in-mold molded product coating forming method, in which coating can be applied to even a portion formed of a mold on a side opposite to a coated surface side continuous to a coated surface of a molded resin product, and further, a next process for cutting an unnecessary portion of the molded resin product can be facilitated.

According to one aspect of the invention an in-mold molded product coating mold, in which a molded resin product is molded by filling a mold cavity formed of a stationary mold and a movable mold with a resin, followed by injecting a coating agent, with which the molded resin product is coated, into the mold cavity, includes a sealing portion molding cavity being positioned outside apart from the mold cavity while including a first molding surface which extends from a parting surface of the mold cavity in a mold mating direction of the stationary mold and the movable mold and is formed at either one of the stationary mold and the movable mold, a second molding surface which extends from the parting surface in a mold opening/closing direction of the mold cavity and is formed at the other of the above-described two molds, and a third molding surface which connects the first molding surface and the second molding surface to each other, and forming a sealing portion for sealing the first molding surface and the second molding surface by filling a resin identical to or different from the above-described resin; and a presser for pressing a pressing surface of the sealing portion defined by the third molding surface under a predetermined pressure, so as to bring the sealing portion into press-contact with the first molding surface and the second molding surface, respectively.

According to another aspect of the invention, an in-mold molded product coating forming method using an in-mold molded product coating mold, in which a molded resin product is molded by filling a mold cavity formed of a stationary mold and a movable mold with a resin, followed by injecting a coating agent, with which the molded resin product is coated, into the mold cavity, includes the steps of: sealing portion molding, in a sealing portion molding cavity positioned outside apart from the mold cavity while including a first molding surface which extends from a parting surface of the mold cavity in a mold mating direction of the stationary mold and the movable mold and is formed at either one of the stationary mold and the movable mold, a second molding surface which extends from the parting surface in a mold opening/closing direction of the mold cavity and is formed at the other of the above-described two molds, and a third molding surface which connects the first molding surface and the second molding surface to each other, forming a sealing portion which seals the first molding surface and the second molding surface by filling a resin identical to or different from the above-described resin; and pressing a pressing surface of the sealing portion defined by the third molding surface under a predetermined pressure, so as to bring the sealing portion into press-contact with the first molding surface and the second molding surface, respectively.

With an in-mold molded product coating mold according to the invention and an in-mold molded product coating forming method according to the invention, the sealing portion having the first, second and third molding surfaces formed at the sealing portion molding cavity can be formed at the parting surface over the entire periphery in separation from the molded resin product by filling the sealing portion molding cavity with the resin identical to or different from the above-described resin. In addition, the pressing surface of the sealing portion defined by the third molding surface is pressed under the predetermined pressure, so that the sealing portion can be brought into press-contact with the first and second molding surfaces, respectively, in the sealing portion molding cavity.

Here, if the cross-sectional shape of the sealing portion is expressed by a simplest shape, generally the first molding surface (i.e., the mold mating surface) and the second molding surface (i.e., the mold opening/closing surface) are oriented at right angles with respect to each other, in which a right triangle has hypotenuses of the pressing surfaces in the case where each of the cross-sections is assumed to be a straight line. Although described for the sake of easy understanding, even if each of the surfaces becomes polyhedral as a result of formation of bends or recesses, there remains the subject matter of having the three surfaces of the in-mold molded product coating mold according to the invention.

With an insertion, the present invention is not limited to only the mold in which the parting surface (i.e., a split surface of each of the stationary mold and the movable mold, being a surface for preventing any leakage of the resin from the mold cavity) is formed in the mold mating direction, and therefore, the parting surface may be formed of either of the mold mating surface and the mold opening/closing surface. Even a mold having a so-called pinch-off structure (i.e., a share edge structure) is treated as the mold having the parting surface in the mold opening/closing direction outside of a parting line, thereby inducing no discrepancy, and therefore, the molds may be of any type.

Incidentally, the first molding surface of the sealing portion molding cavity is located in the mold mating direction of either one of the stationary mold and the movable mold whereas the second molding surface is located in the mold opening/closing direction of the other mold.

(Each of the stationary mold and the movable mold may be expressed by either one of the mold on the coated surface side or the mold on the side opposite to the coated surface side.)

As a consequence, even if the mold is finely opened before the injection of the coating agent, the sealing portion can be brought into press-contact with the second molding surface together with the first molding surface as long as the second molding surface has the cross-sectional length greater than the finely mold opening amount.

In view of this, with the in-mold molded product coating mold according to the invention and the in-mold molded product coating forming method according to the invention, the molded resin product formed by filling the mold cavity with the resin and the sealing portion formed by filling the sealing portion molding cavity with a resin identical to or different from the above-described resin are separated from each other, so that the force for pressing the sealing portion pressing surface cannot exert on the molded resin product, thereby preventing any deformation of the molded resin product. Furthermore, the injection pressure of the coating agent and the mold cavity inner pressure at the time of the mold clamping repeat operation cannot exert any influence on the pressing force via the molded resin product.

Consequently, the sealing portion can be brought into press-contact with the first molding surface and the second molding surface by the secure pressing force. In this manner, the coating agent injected into the mold cavity can be securely prevented from leaking to each of the parting surface outside of the sealing portion and the pressing surface. The prevention of the leakage to the pressing surface can prevent any leakage toward the parting surface outside of the sealing portion via the pressing surface, and further, any leakage of the coating agent having a low viscosity from the pressing surface toward the presser to cause the occurrence of operational deficiency or the like of the presser.

In addition, since the molded resin product and the sealing portion are separated from each other, the coating agent injected on the side of the coated surface of the molded resin product can be injected at the mold cavity surface on the side opposite to the coated surface side continuous to the coated surface inside of the mold cavity. The coating can be applied also to the portion defined by the mold on the side opposite to the coated surface side of the molded resin product, and further, the molded resin product and the sealing portion are connected to each other not via the molten resin but only via the remarkably thin hardened coating agent whose low viscosity allows leakage at the parting surface, at the parting surface for separating the molded resin product and the sealing portion from each other after the coating operation, thus to be readily separated in detaching the mold after hardening the coating agent. The next process for the molded resin product can be facilitated since it is unnecessary to cut the resin in conformity with the shape of the product.

With the remarkably small separation distance, the entire hardened coating agent remaining at the parting surface having the remarkably small width adheres to either one of the molded resin product and the sealing portion, and therefore, never remains on the mold. Since the sealing portion is discarded and molded for every molded resin product, it is unnecessary to clean the mold, thus achieving efficient production.

Here, the resin forming the sealing portion may be the same as the resin for the molded resin product, and may be injected independently from two portions. Otherwise, if there is a runner gate in the molded resin product, the resin may be injected while branching from the runner gate. Alternatively, a resin which is different from that of the molded resin product and is suitable for the sealing portion may be injected independently from two portions.

According to another feature of the invention, the sealing portion molding cavity is positioned around the entire circumference of the mold cavity, and a communicating portion which is formed at either one of the molds to thus communicate between the mold cavity and the sealing portion molding cavity is provided at an arbitrary location of the parting surface formed between the mold cavity and the sealing portion molding cavity; and the communicating portion has a required minimum cross-sectional area that is enough to allow the resin to pass therethrough and be filled in the sealing portion molding cavity, or the communicating portion is interposed between the sealing portion molding cavity having the third molding surface at a mold on a coated surface side of the molded resin product and the mold cavity.

As a consequence, the position for the communication portion is located at a position which cannot be seen from the outside, and further, the communication portion has a minimum cross-sectional area enough to allow the resin to flow therethrough, so that the sealing portion can be readily formed with the same resin as that of the molded resin product without almost degrading all of the above-described effects.

In comparison with the case where the molded resin product and the sealing portion are completely separated from each other, the small communication portion which may be broken during the finely mold opening operation hardly exerts any influence on the pressing force of the sealing portion, thus achieving the secure sealability. The portion formed with the mold on the side opposite to the coated surface side in the molded resin product can be coated, and therefore, the resin which need be cut in the next process is only the resin remaining at the communication portion (the portion which cannot be seen from the outside) over the entire circumference.

Heretofore, the description has been given of the effects exemplified by the coating of the portion defined by the mold on the side opposite to the coated surface side of the molded resin product and the facilitated next process. Even with a complicated next process, there may be a molded resin product in which it is undesirable to inject the coating agent on the side opposite to the coated surface side. Even in this case, the present invention is effective.

That is to say, the location may be limited such that the sealing portion pressing surface is provided at the mold on the coated surface side, and further, that the sealing portion is brought into press-contact with the mold surface on the side opposite to the coated surface side, and the communication portion may be disposed over the entire circumference such that the coating agent cannot be injected into the mold cavity on the side opposite to the coated surface side.

In this manner, all of the molded resin product, the sealing portion and the communication portion are integrated with each other. Here, the surface against which the molded resin product is pressed under the mold cavity inner pressure produced by the injection of the coating agent and the mold clamping repeat operation after the finely mold opening operation and the surface with which the sealing portion is brought into press-contact form the mold surface on the side opposite to the coated surface side in the same direction, and therefore, no force for deforming the molded resin product exerts, and further, the sealing portion pressing force is never degraded although the pressing force may be assisted or alleviated by the mold cavity inner pressure, thus achieving the secure sealabiltiy.

Since the communication portion per se is pressed against the mold surface on the side opposite to the coated surface side, it is unnecessary to consider the strength against the deformation of the molded resin product or the inner pressure breakage of the communication portion, thereby achieving the required minimum thickness over the entire circumference, so as to relatively facilitate the next process.

Moreover, the sealing portion includes the two sealing surfaces defined by the first and second molding surfaces, so that a small degassing cutout inside of the mold cavity is formed at the communication portion therebetween. Even if a small quantity of the coating agent flows out together with gas toward the side opposite to the coated surface of the communication portion, the coating agent cannot leak outward.

As a consequence, the resin communication portion interposed between the mold cavity and the sealing portion molding cavity can facilitate the formation of the sealing portion with the same resin together with the molded resin product without almost degrading the afore-mentioned effects.

Additionally, no coating agent can be injected to the mold cavity surface on the side opposite to the coated surface side, as required.

With the in-mold molded product coating mold and the in-mold molded product coating forming method according to the present invention, it is possible to enhance the secure sealability for preventing any leakage of the coating agent injected into the mold cavity toward the parting surface outside of the sealing portion without deforming the molded resin product. In addition, it is possible to inject the coating agent also to the portion formed by the mold on the side opposite to the coated surface side continuous to the coated surface of the molded resin product and further, to facilitate the next process of cutting the unnecessary portion of the molded resin product.

DETAILED DESCRIPTION OF PREFERRED EMBODIMENTS

<First Preferred Embodiment>

Figure 1:
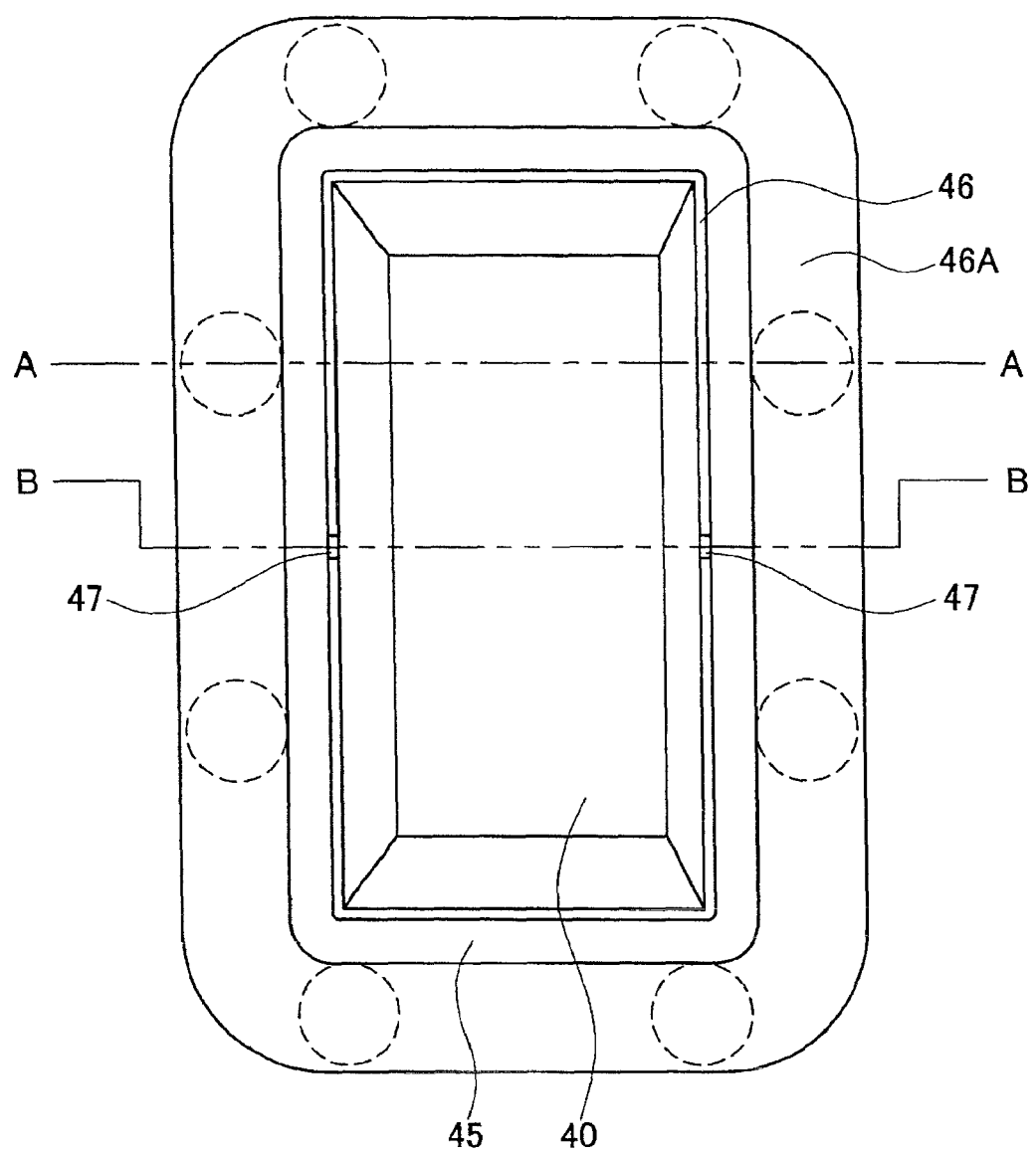
FIG. 1 is a plan view schematically showing a movable mold in an in-mold coating forming apparatus 1 in a first preferred embodiment.
Figure 2:
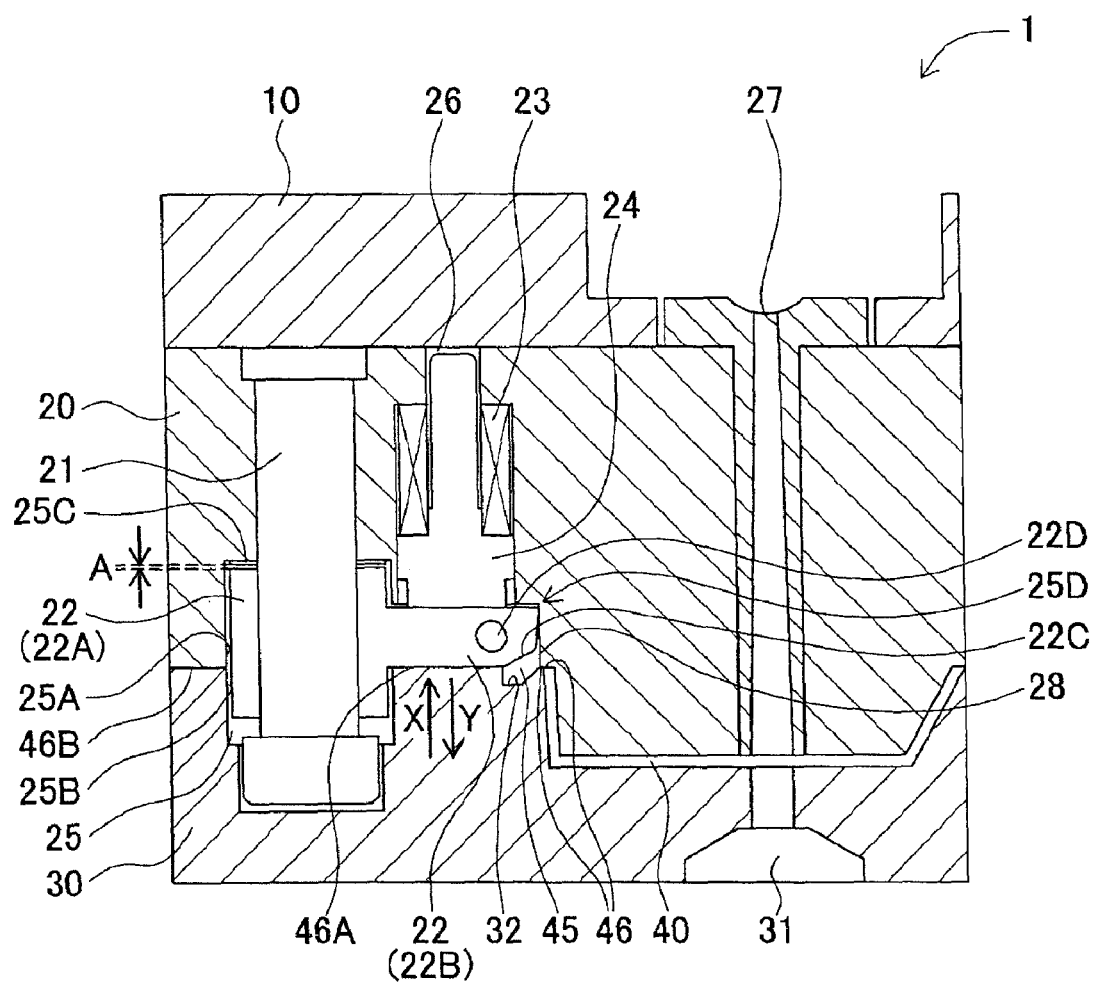
FIG. 2 is a view showing the principal configuration in an A-A cross section of the in-mold coating forming apparatus shown in FIG. 1.
Figure 3:
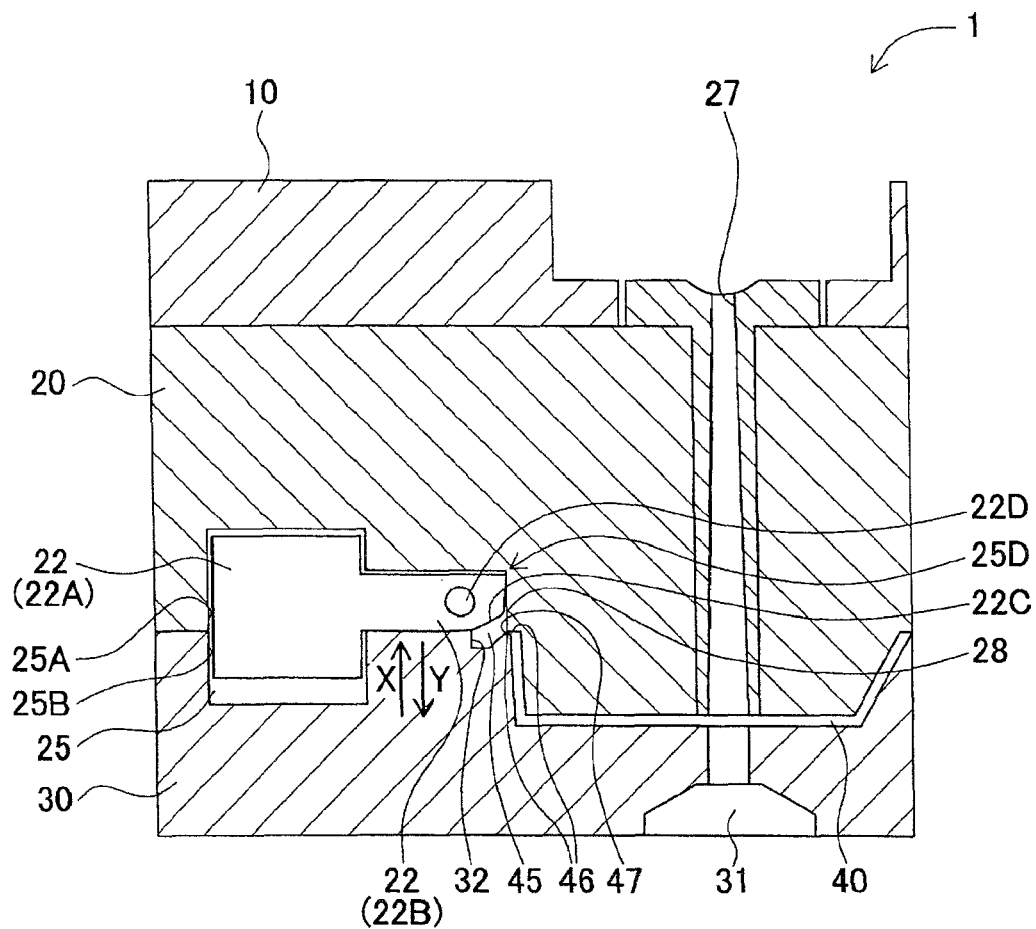
FIG. 3 is a view showing the principal configuration in a B-B cross section of the in-mold coating forming apparatus shown in FIG. 1.

A first preferred embodiment according to the present invention will be described with reference to FIGS. 1 to 8. FIG. 1 is a plan view schematically showing a movable mold in an in-mold coating forming apparatus 1 in a first preferred embodiment, wherein virtual lines schematically indicate positions of pressing portions formed at a stationary mold. FIG. 2 is a view showing the principal configuration in an A-A cross section of the in-mold coating forming apparatus 1 shown in FIG. 1. FIG. 3 is a view showing the principal configuration in a B-B cross section of the in-mold coating forming apparatus 1 shown in FIG. 1. Here, FIG. 1 shows only an inside end of reference numeral 25B shown in FIG. 2.

The in-mold coating forming apparatus 1 shown in the drawings includes a stationary disk 10, a stationary mold 20 and a movable mold 30.

The stationary mold 20 is fixed to the stationary disk 10. The stationary mold 20 is provided with a movable plate 22, a coil spring 23, a piston 24 and a support pin 21. On the plane, the movable plate 22 is an annular member surrounding the entire periphery of a cavity 40, pressers, each of which consists of the coil spring 23 and the piston 24, are interspersed at a plurality of points, as indicated by the virtual lines in FIG. 1. Furthermore, the support pins also are interspersed at a plurality of points.

Here, the coil spring 23 exemplifies a pressing mechanism recited in claim 3, and the movable plate 22 exemplifies a sealing portion molding cavity forming member recited in claim 4.

One end of the support pin 21 is fixed to the stationary mold 20. The other end of the support pin 21 is contained inside of a movable plate containing hole 25. The movable plate containing hole 25 is a space defined by a first recess 25A formed at the stationary mold 20 and a second recess 25B formed at the movable mold 30 when the stationary mold 20 and the movable mold 30 mate with each other.

Here, an end 25D of the first recess 25A exemplifies a mold opening/closing surface including the second molding surface.

To the first recess 25A is secured a movable plate movement restricting member 25C. The movable plate movement restricting member 25C is adapted to stop the movable plate 22 from sliding in a mold clamping direction X. The movable plate movement restricting member 25C exemplifies a stopper (i.e., a restricting portion).

The movable plate 22 is housed in the movable plate containing hole 25. The movable plate 22 includes a plate main body 22A and an arm 22B. The plate main body 22A is held by the support pin 21 in such a manner as to freely slide in the mold clamping direction X and a mold opening direction Y. At the tip of the support pin 21 is disposed a stopper bolt for preventing the movable plate 22 from falling down.

The arm 22B projects from the plate main body 22A in a mold mating direction in such a manner as to abut against a parting surface 46A on the side of the movable mold. At the tip of the arm 22B is formed a slope 22C. Reference numeral 22D in the drawings denotes a heater.

The parting surface 46A on the side of the movable mold exemplifies a mold mating surface including a first molding surface recited in claim 4. The slope 22C exemplifies the entire surface of a third molding surface.

At the stationary mold 20 is formed a coil spring containing hole 26 on a side opposite to the movable plate slope 22C. The coil spring containing hole 26 communicates with the movable plate containing hole 25. The coil spring 23 is housed in the coil spring containing hole 26 in a compressed manner in a state in which the lower end of the coil spring 23 abuts against the piston 24. The tip of the piston 24 abuts against the arm 22B of the movable plate 22 by the force of the coil spring 23. The forces of the plurality of coil springs 23 act as pressing forces against the movable plate 22. Reference numeral 27 in the drawings denotes a sprue. The sprue 27 communicates with the cavity 40.

The movable mold 30 is provided with a coating injection port 31 and a sub cavity forming groove 32. The coating injection port 31 communicates with the cavity 40. To the coating injection port 31 is connected a coating injection machine (not shown).

The sub cavity forming groove 32 is formed on a movable mold parting surface 46A around the entire circumference of the cavity 40 while holding a parting surface 46 (i.e., a separation distance width) therebetween.

The sub cavity forming groove 32 exemplifies a recess defining the first molding surface.

As shown in FIGS. 1 and 3, a sub cavity 45 is defined by the stationary mold 20 and the movable mold 30 mating with each other around the cavity 40 while securing a predetermined distance from the cavity 40 in a B-B cross section in FIG. 1 showing the in-mold coating forming apparatus 1.

The sub cavity 45 exemplifies a sealing portion molding cavity defined by the sub cavity forming groove 32, a sub cavity forming surface 28 serving as a part of the end 25D of the first recess 25A and the slope 22C. Here, the sub cavity forming surface 28 exemplifies a second molding surface extending from the parting surface 46 in the mold clamping direction X. The sub cavity forming surface 28 has a cross-sectional length greater than a finely mold opening amount.

Between the cavity 40 and the sub cavity 45 is formed a through portion 47.

As shown in FIG. 3, the sub cavity 45 communicates with the cavity 40 via the through portion 47 in the B-B cross section of the in-mold coating forming apparatus 1. In contrast, the sub cavity 45 does not communicate with the cavity 40 in an A-A cross section shown in FIG. 2. In the present preferred embodiment, the through portions 47 are formed at two portions at the parting surface 46 of the movable mold 30. The cross-sectional area of the through portions 47 is set to 5 mm² to 7 mm² in total at the two portions. The communication portion allows a molten resin to flow from the cavity 40 toward the sub cavity 45, and further, enables the sealing portion formed of the sub cavity 45 to be formed over the entire circumference.

The present preferred embodiment has an object such that the coating is applied also to an end of a molded resin product defined by the mold cavity surface on the side opposite to the coated surface side continuously to the coated surface of the molded resin product. Therefore, the communication portion is limited in location and has a required minimum cross-sectional area.

Next, description will be made on the operation of the in-mold coating forming apparatus 1. In the in-mold coating forming apparatus 1, the movable mold 30 is made to advance toward the stationary mold 20 by a mold clamping cylinder (not shown). As shown in FIG. 2, the movable mold 30 is made to mate with the stationary mold 20.

When the movable mold 30 is made to mate with the stationary mold 20, the cavity 40 and the sub cavity 45 are formed. The mold clamping cylinder allows a predetermined mold clamping force to act on the movable mold 30 and the stationary mold 20.

When the movable mold 30 is made to mate with the stationary mold 20, the movable plate arm 22B is pressed by the coil spring 23 and the piston 24, to abut against the parting surface 46A, as shown in FIGS. 2 and 3. In this state, a clearance A is defined between an upper surface of the movable plate main body 22A and the movable plate movement restricting member 25C. (A dimension of the clearance A is about 0.1 mm in the present preferred embodiment, but it may be varied according to the type of the resin or a melting viscosity.)

Figure 4:
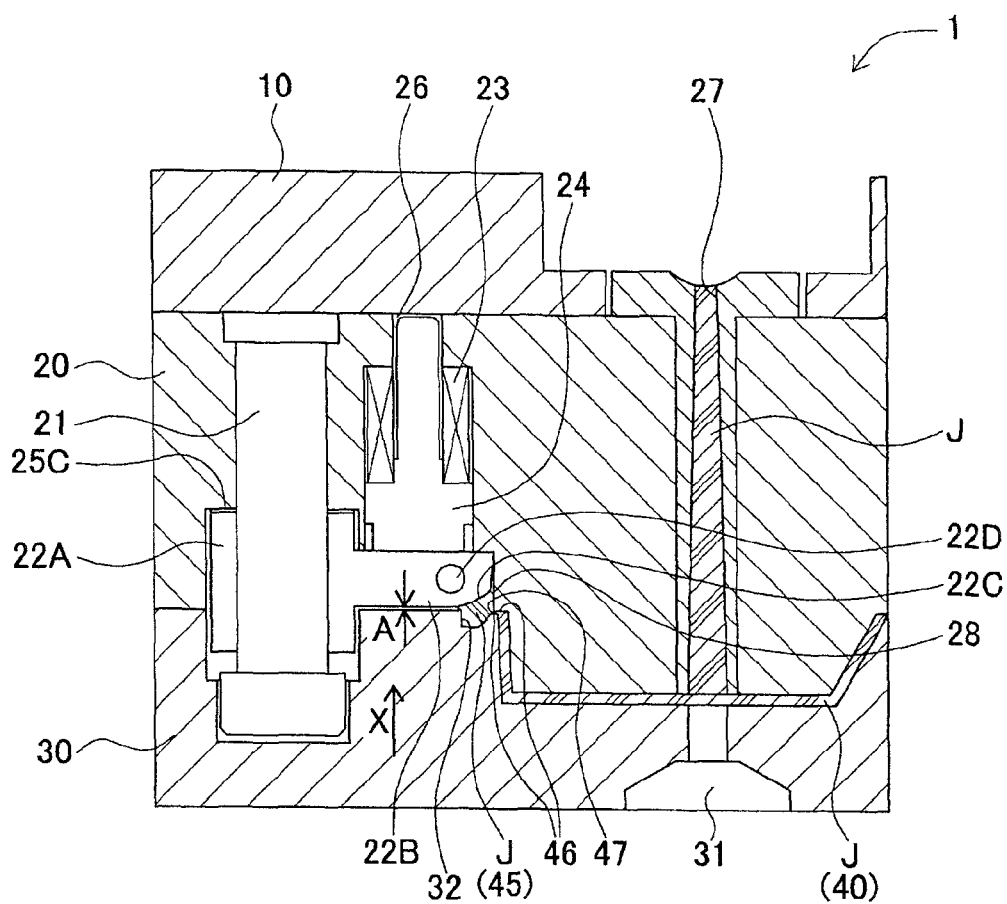
FIG. 4 is a cross-sectional view showing mainly the in-mold coating forming apparatus during injection molding.

As shown in FIG. 4, a thermoplastic molten resin J is injected into the cavity 40 and the sub cavity 45 by a screw (not shown) through the sprue 27 in the B-B cross section of the in-mold coating forming apparatus 1.

In uniformly distributing the molten resin J within the sub cavity 45, the arm 22B is held at a predetermined temperature by the heater 22D.

Here, with the screw (not shown), the injected molten resin J is filled into the cavity 40 through the sprue 27, and simultaneously, flows into the sub cavity 45 through the through portion 47. A pressure that can completely fill the molten resin J into the mold cavity is normally 30 Mpa or higher.

As recited in claim 8, since the pressing force of the movable plate 22 acting on the slope 22C is set to be smaller than an injection pressure of the molten resin J, the molten resin J staying in the sub cavity 45 pushes up the slope 22C in the mold clamping direction X, as shown in FIG. 4. As the slope 22C is pushed up in the mold clamping direction X, the plate main body 22A formed integrally with the arm 22B is moved in the mold clamping direction X by the distance of the clearance A abutting against the movable plate movement restricting member 25C.

At this time, the piston 24 is also pushed up, and therefore, the coil spring 23 is contracted.

When the plate main body 22A abuts against the movable plate movement restricting member 25C, the clearance A is defined between the arm 22B and the movable mold parting surface 46A. Since the dimension of the clearance A is set to about 0.1 mm, the molten resin J staying inside of the sub cavity 45 can be prevented from flowing outside between the arm 22B and the movable mold parting surface 46A. In the present preferred embodiment, the dimension of the clearance A exemplifies a predetermined dimension recited in claim 4.

Figure 5:
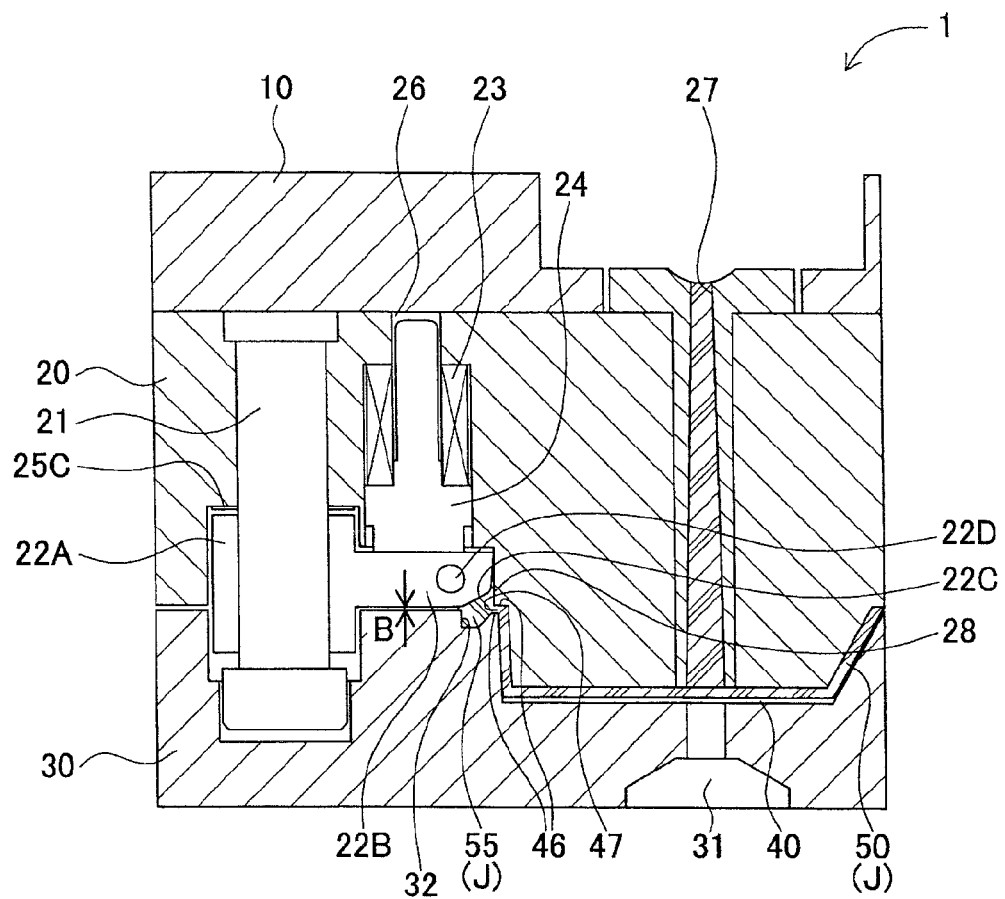
FIG. 5 is a cross-sectional view showing mainly the in-mold coating forming apparatus when a coating is injected into a cavity.

After the completion of the injection, the high-temperature molten resin J staying inside of the cavity 40 is cooled at a mold temperature, followed by hardening. As a consequence, a molded resin product 50 and a parting surface sealing member 55 shown in FIG. 5 are molded mostly in separation from the parting surface 46 except a portion defined by the through portion 47.

During the cooling and hardening processes, molding contraction occurs in most of the thermoplastic resin. According to the shape of a molded resin product, a coating agent may be injected into a clearance defined inside of the mold cavity by the molding contraction without finely opening a mold. As a matter of course, the molding contraction occurs also in the parting surface sealing member 55. However, the arm 22B presses the parting surface sealing member 55 all the time in a mold opening direction Y by the force of the coil spring 23, so that the coil spring 23 expands to move the arm 22B in the mold opening direction Y following the molding contraction of the parting surface sealing member 55 while the slope 22C and the parting surface sealing member 55 are brought into close contact with each other when there is no resin injecting pressure upon the completion of the filling of the resin and the holding of the pressure. In these steps, the step until the completion of the filling of the resin and the holding of the pressure exemplifies a sealing portion molding step recited in claim 6, and further, the step thereafter exemplifies a molding contraction following pressing step recited in claim 8.

Since the molding contraction following pressing step is implemented in the mold-damped state, the movement distance in the mold opening direction Y is restricted by the clearance A. Even if so, the size per se of the parting surface sealing member 55 may be reduced such that the molding contraction amount of the parting surface sealing member 55 becomes smaller than a restriction amount. The molding contraction amount is generally 1% or less. This value may be further reduced by increasing a resin injection pressure or prolonging a pressure holding time.

As recited in claim 3, if the sealing portion molding cavity forming member can press a part of the pressing surface of the sealing portion and does not have any mating surface with a facing mold, the clearance A eliminates the need to consider the outward overflow but increases restriction from the viewpoint of manufacture.

As recited in claim 4, the arm 22B in the present preferred embodiment has a structure in which a surface of a corner machined member having two surfaces, that is, mating surfaces with respect to the mold mating surface and the mold opening/closing surface defines the entire surface of the third molding surface (i.e., the slope 22C), and therefore, the sealing portion can be arbitrarily reduced in size. As a consequence, not only the molding contraction amount of the parting surface sealing member 55 can be reduced but also the area receiving the pressure can be reduced. Therefore, a force which a pressing mechanism has also can be reduced, thereby reducing the size and number of coil springs 23.

In addition, from the viewpoint of the shape, the movable plate 22 has a great degree of freedom in terms of a design of a position of the presser, the strength of a plate member, the shape of the slope and the like, thereby facilitating the design and fabrication.

A clearance B shown in FIG. 5 results from variations of the clearance A in the molding contraction following pressing step. After the molten resin J is hardened, the movable mold 30 and the stationary mold 20 are opened by a predetermined interval. At this time, the coil spring 23 and the piston 24 pushes down the arm 22B in the mold opening direction Y while the slope 22C and the parting surface sealing member 55 are brought into close contact with each other, like the molding contraction following pressing step. This step exemplifies a finely mold opening following pressing step recited in claim 8. Thereafter, a thermocurable coating is injected into the cavity 40 in a predetermined quantity through the coating injection port 31 shown in FIG. 5 by the above-described coating injection machine. In the present preferred embodiment, the thermosetting coating exemplifies a coating agent.

Subsequently, a predetermined mold clamping force is made to act by the above-described mold clamping cylinder in order to conduct mold clamping again. With the mold clamping repeat operation, the coating is uniformly distributed over the molded resin product 50. In the meantime, the molded resin product and the sealing portion are separated from each other, so that the coating injected from the side of the coated surface of the molded resin product can be injected at the mold cavity surface on the side opposite to the coated surface continuous to the coated surface inside of the mold cavity. The coating is fixed and hardened by a predetermined mold clamping force at a predetermined mold temperature.

During a time after the injection of the coating till the mold clamping pressure is held for fixing and hardening the coating, the coating tends to leak from a clearance between the parting surface sealing member 55 and each of the surfaces of the sub cavity forming groove 32, as well as from a clearance between the parting surface sealing member 55 and the sub cavity forming surface 28 by a coating injection pressure received from the side of the coated surface of the molded resin product 50 or a mold cavity inner pressure generated by the mold clamping repeat operation thereafter. At this time, the parting surface sealing member 55 receives the mold cavity inner pressure from both of each of the surfaces of the sub cavity forming groove 32 and the sub cavity forming surface 28 via the coating. The pressures are synthesized to act at the pressing surface of the parting surface sealing member 55. Here, since the pressing force of the movable plate 22 is set such that a pressing force greater than the above-described pressure acts at the slope 22C of the arm 22B, the parting surface sealing member 55 may be brought into press-contact with both of any one of the surfaces of the sub cavity forming groove 32 and the sub cavity forming surface 28. As a matter of course, the molded resin product 50 and the parting surface sealing member 55 are mostly separated from each other except the portion defined by the through portion 47, and therefore, there is an important presumption that there is no external factor imparting an influence on the pressing force of the parting surface sealing member 55. Consequently, it is possible to prevent the coating from leaking outward and toward the presser from both of the sub cavity forming groove 32 and the sub cavity forming surface 28 by the certain pressing force.

The mold cavity inner pressure produced during this operation is about 1 Mpa to 10 Mpa and is normally lower than the resin injection pressure. Therefore, if the predetermined pressing force is set within a range of the mold cavity inner pressure or higher and the resin injection pressure or lower, the pressing force need not be varied in any step. As a consequence, the inexpensive coil spring 23 is used as the pressing mechanism and the pressing force is set to be the cavity inner pressure or higher and the resin injection pressure or lower in the present preferred embodiment. Of course, a hydraulic pressure may be preferably used as the pressing mechanism, thereby producing effects that pressure may be varied to an optimum value per step, and further, a time for finding an optimum condition can be shortened. Incidentally, the piston 24 in the present preferred embodiment is not always needed in the case where the pressing mechanism is the coil spring, but may be varied to a hydraulic piston.

Figure 6:
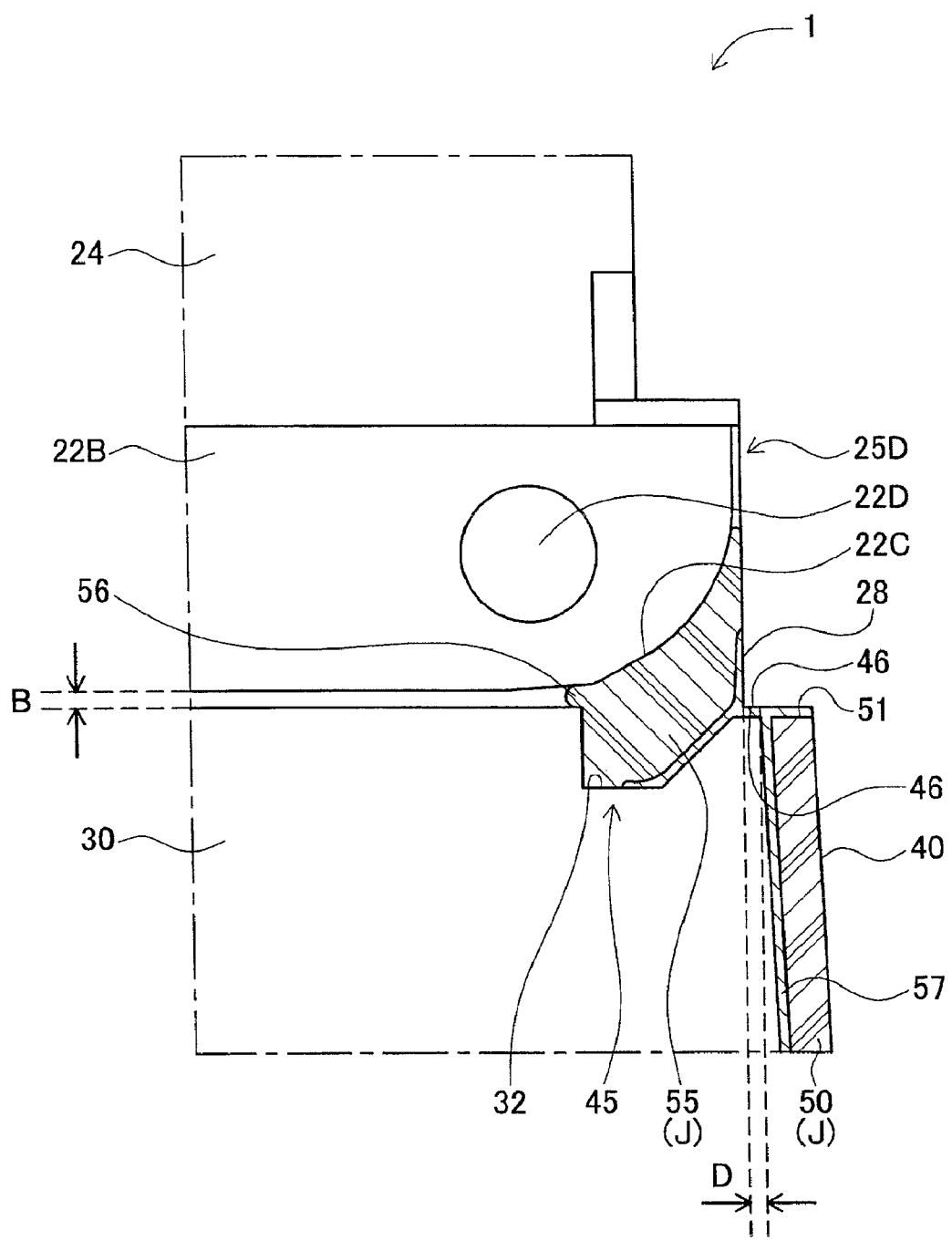
FIG. 6 is an enlarged view showing the vicinity of a sub cavity 45 in the A-A cross section of the in-mold coating forming apparatus.

FIG. 6 is an enlarged view showing the vicinity of the sub cavity 45 in the A-A cross section of the in-mold coating forming apparatus 1. FIG. 6 illustrates a state in which a thermosetting coating 57 is injected into the cavity 40. The molded resin product 50 and the parting surface sealing member 55 are molded in separation from each other while holding the parting surface 46 therebetween. The molded resin product 50 is stuck to the stationary mold 20 in such a manner as to surround it by the molding contraction. The coating 57 injected by finely opening the mold on the side of the movable mold 30 is uniformly distributed in the clearance defined between the coated surface of the molded resin product 50 and the cavity surface on the side of the movable mold 30 by the mold clamping repeat operation, and further, is uniformly distributed also at an end 51 of the molded resin product 50 formed by the cavity surface on the side of the stationary mold 20.

The viscosity of the coating 57 is lower than that of the molten resin J. As a consequence, the coating 57 flows toward the sub cavity 45 through a slight clearance defined between the parting surfaces 46. In contrast, since the parting surface sealing member 55 is pressed against each of the sub cavity forming groove 32 and the sub cavity forming surface 28, the coating 57 is stopped from flowing on the way of each of the sub cavity forming groove 32 and the sub cavity forming surface 28.

In the present preferred embodiment, the arm 22B is held at the predetermined high temperature by the heater 22D, as described above. As a result, it is possible to suppress the temperature of the molten resin J injected into the sub cavity 45 from dropping. In this manner, the molten resin J can be promoted to be filled over the entire sub cavity 45. The hardening of the thermosetting coating 57 may be promoted but not be retarded. The heater 22D may be a hot water passage.

Reference numeral 56 in the drawings designates a small quantity of a burr of the molten resin J overflowing toward the clearance A (B) from the sub cavity 45 in the sealing portion molding step. There arises no problem even if a burr in a small quantity occurs on the parting surface sealing member 55 which will be unnecessary in the end.

In the present preferred embodiment, a separation distance D between the cavity 40 and the parting surface sealing member 55 is about 0.5 mm (see FIG. 6). The coating 57 is poorer in mold separability than the molten resin J. However, the hardened coating 57 remaining between the parting surfaces 46 at as small as 0.5 mm is completely bonded to either the molded resin product 50 or the parting surface sealing member 55, but never remains on the mold in contact. As a result, the mold need not be cleaned, thereby achieving efficient production.

The mold separability can be considerably improved also owing to a mold surface treatment or a coating mold separability. Meanwhile, the separation distance may be set to not 0 but an arbitrary numerical value of 0 or more.

Figure 7:
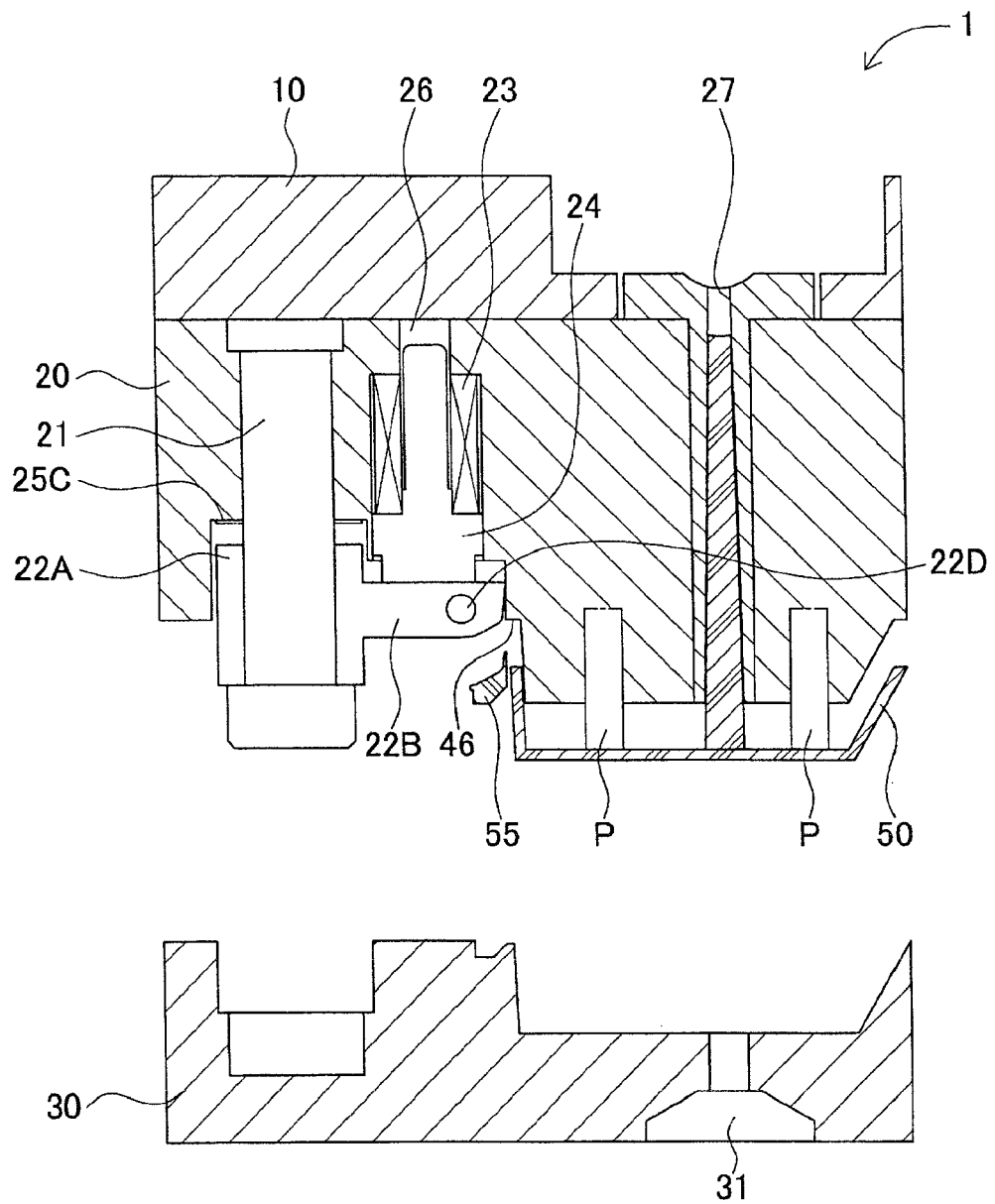
FIG. 7 is a cross-sectional view showing mainly the in-mold coating forming apparatus during mold detachment.

FIG. 7 illustrates a state in which the mold is opened in taking out a product. As illustrated in FIG. 7, the molded resin product 50 having the coating formed to the end thereof is detached from the mold by eject pins P. In detaching the molded resin product 50 from the mold, the parting surface sealing member 55 continuous to the molded resin product 50 via the through portions 47 is also detached. The two small through portions 47 can be easily broken by a cutter after the detachment. A complicated resin cutting process is unnecessary.

<Effects of First Preferred Embodiment>

According to the in-mold coating forming apparatus 1 and the in-mold coating forming method in the present preferred embodiment, the molten resin J is allowed to flow through the through portions 47 having the required minimum cross-sectional area from the cavity 40 into the sub cavity 45 positioned over the entire periphery in separation from the cavity 40, thereby molding the parting surface sealing member 55. In addition, in order to bring the parting surface sealing member 55 into press-contact with the sub cavity forming groove 32 and the sub cavity forming surface 28, the slope 22C of the arm 22 presses the pressing surface of the parting surface sealing member 55 in close contact with the slope 22C.

In view of this, according to the in-mold coating forming apparatus 1 and the in-mold coating forming method in the present preferred embodiment, the coating can be prevented from leaking outside and toward the pressing portion from both of the sub cavity forming groove 32 and the sub cavity forming surface 28 by the secure pressing force without any deformation of the molded resin product 50. Therefore, the sealability can be enhanced to a secure level. Additionally, the coating 57 can be uniformly distributed also at the end 51 of the molded resin product 50 formed at the cavity surface on the side of the stationary mold 20 continuous to the coated surface of the molded resin product 50, and further, the next process can be facilitated without any need for the complicated resin cutting after detaching the molded product from the mold. Moreover, the parting surface sealing member 55 can be readily molded with the same resin as that to be filled in the cavity 40.

According to the in-mold coating forming apparatus 1 and the in-mold coating forming method in the present preferred embodiment, the arm 22B is restricted in the slide amount in the mold clamping direction X by the movable plate movement restricting member 25C in the sealing portion molding step. In addition, the arm 22B slides in the molding contraction following pressing step and the finely mold opening following pressing step in the mold opening direction Y by the spring force of the coil spring 23, so that the slope 22C of the arm 22B presses the parting surface sealing member 55. The spring force of the coil spring 23 is set to be the cavity inner pressure or greater by mold clamping repeat operation performed with respect to the slope 22C and the resin injection pressure or smaller.

In view of this, according to the in-mold coating forming apparatus 1 and the in-mold coating forming method in the present preferred embodiment, the arm 22B slides up to the position restricted by the movable plate movement restricting member 25C under the resin injection pressure in the sealing portion molding step, thereby securing the initial shape of the parting surface sealing member 55.

Furthermore, due to the spring force of the coil spring 23, the slope 22C of the arm 22B brings the parting surface sealing member 55 molded with the sub cavity 45 into press-contact with each of the sub cavity forming groove 32 and the sub cavity forming surface 28 in the sub cavity 45 in the molding contraction following pressing step and the finely mold opening following pressing step.

According to the in-mold coating forming apparatus 1 and the in-mold coating forming method in the present preferred embodiment, the slope 22C is formed by machining the corner of the arm 22B of the movable plate 22 having the two surfaces serving as the mating surfaces with respect to the parting surface 46A on the side of the movable mold and the end 25D of the first recess 25A, wherein the slope 22C can abut against the entire pressing surface of the parting surface sealing member 55. In the sealing portion molding step, the slide amount restriction value in the mold clamping direction X is set to the clearance A that is enough to prevent the molten resin J from overflowing outside of the sub cavity 45 with the separation distance between the arm 22B and the parting surface 46A.

In view of this, according to the in-mold coating forming apparatus 1 and the in-mold coating forming method in the present preferred embodiment, the slope 22C of the movable plate 22 can be arbitrarily reduced in size by machining the corners at the bidirectional surfaces of the arm 22B. Furthermore, with the abutment against the entire pressing surface of the parting surface sealing member 55, the pressing area with respect to a pressure receiving area can be greater. As a consequence, the force of the pressing mechanism can be reduced, thereby reducing the size and number of coil springs 23. At the same time, the molding contraction amount of the parting surface sealing member 55 in the mold opening/closing direction can be set to become smaller than the clearance A. In this manner, the molding contraction following pressing step can be implemented even with the restriction in the mold opening direction Y.

Besides, from the viewpoint of the shape, the movable plate 22 has a great degree of freedom in terms of a design of a position of the pressing portion, the strength of a plate member or the shape of the slope, thereby facilitating the design and fabrication.

According to the in-mold coating forming apparatus 1 and the in-mold coating forming method in the present preferred embodiment, the heater 22D provided for the arm 22B of the movable plate 22 adjusts the temperature of the arm 22B. Therefore, the heater 22D can hold the arm 22B at the predetermined high temperature.

In view of this, according to the in-mold coating forming apparatus 1 and the in-mold coating forming method in the present preferred embodiment, the arm 22B is held at the predetermined high temperature, thereby suppressing the temperature of the molten resin J injected into the sub cavity 45 via the slope 22C of the arm 22B from dropping.

Consequently, according to the in-mold coating forming apparatus 1 and the in-mold coating forming method in the present preferred embodiment, the temperature of the molten resin J injected into the sub cavity 45 can be suppressed from dropping, so that the fluidity of the molten resin J can be suitably kept. As a result, it is possible to promote filling of the molten resin J over the entire sub cavity 45.

Figure 8:
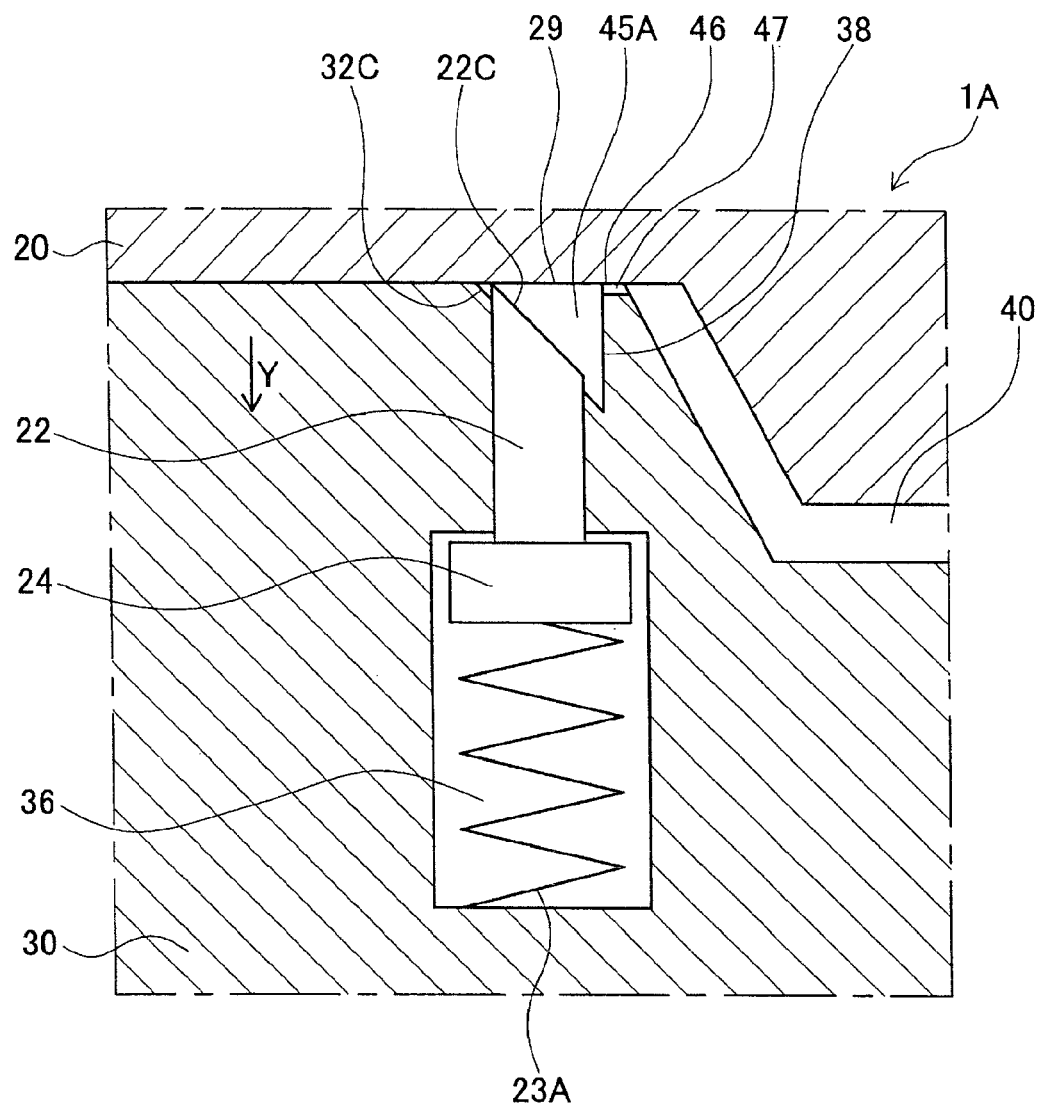
FIG. 8 is a view schematically showing the configuration of the in-mold coating forming apparatus in a second cross section according to the invention.
Figure 9:
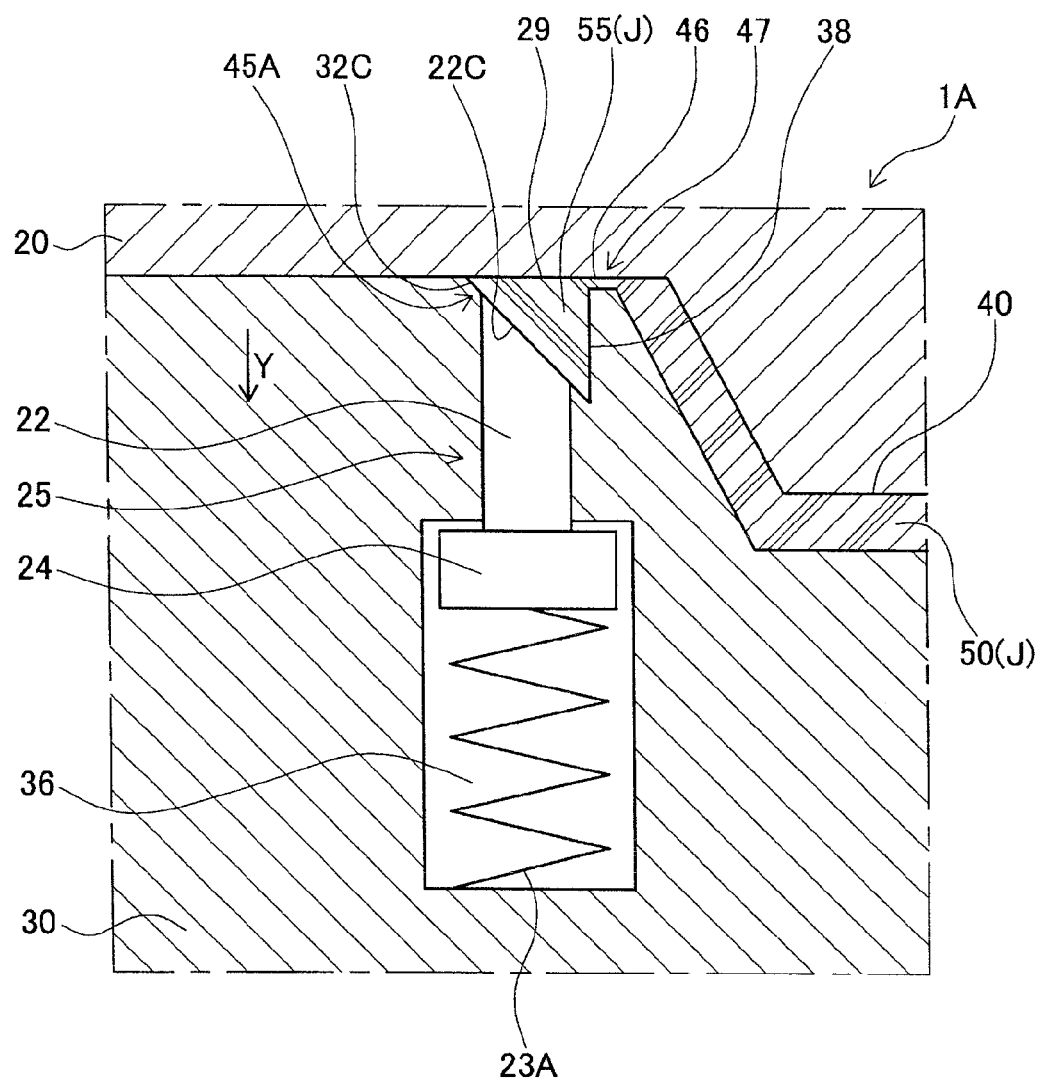
FIG. 9 is a view illustrating a state in which a thermoplastic molten resin is injected into a cavity and a sub cavity in the apparatus shown in FIG. 8.
Figure 10:
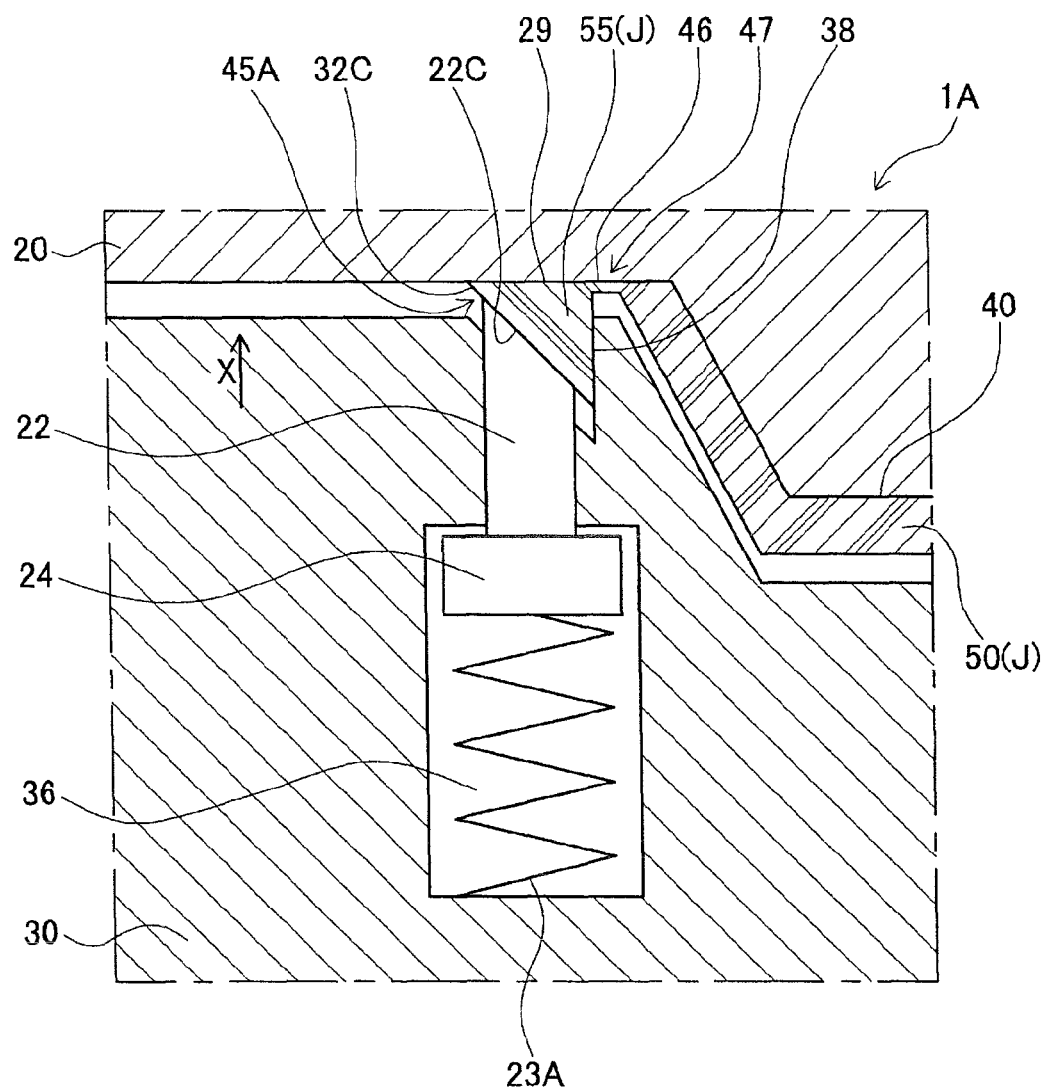
FIG. 10 is a view illustrating a state in which a movable mold and a stationary mold in the apparatus shown in FIG. 8 are separated from each other with a predetermined interval.

Reference is now made to conceptual views of FIGS. 8 to 10.

Here, the same constituents as those in the first preferred embodiment will be designated by the same reference numerals, and therefore, their explanation will be omitted. Incidentally, important terms recited in claims are written along with the reference numerals for explanation. FIGS. 8 to 10 are views schematically showing the constitution of a second cross section of the in-mold coating forming apparatus 1A. The second cross section corresponds to the B-B cross section in the first preferred embodiment. FIG. 9 shows the second cross section in the sealing portion molding step, and FIG. 10 shows the second cross section at the time when the mold is finely opened.

As shown in FIG. 8, the mold recited in claim 1 is provided with: the sub cavity 45A (the sealing portion molding cavity) being positioned outside apart from the cavity 40 while including the first sub cavity forming surface 29 (the first molding surface) which extends from the parting surface 46 in the mold mating direction of the stationary mold 20 and the movable mold 30 outside of the cavity 40 and is formed at the stationary mold, the second sub cavity forming surface 38 (the second molding surface) which extends from the parting surface 46 in the mold opening/closing direction of the cavity 40 and is formed at the movable mold 30, and the third sub cavity forming surface 32C (the third molding surface) which connects the first sub cavity forming surface 29 and the second sub cavity forming surface 38 to each other, and forming the parting surface sealing member 55 (the sealing portion) for sealing the first sub cavity forming surface 29 and the second sub cavity forming surface 38 by filling the molten resin J; and the presser including the movable plate 22, the piston 24, the pressing portion and the coil spring 23A, for pressing the pressing surface of the parting surface sealing member 55 defined by the third sub cavity forming surface 32C under the predetermined pressure, so as to bring the parting surface sealing member 55 into press-contact with the first sub cavity forming surface 29 and the second sub cavity forming surface 38, respectively.

Here, the first sub cavity forming surface 29 (the first molding surface) constitutes a part of the parting surface. The idea of the cross-sectional shape of the sub cavity 45A (the sealing portion molding cavity), as shown, is a right triangle, as described above, by the other second and third sub cavity forming surfaces 38 and 32C constituting the sub cavity 45A (FIG. 9). At the movable mold 30 are formed the coil spring containing hole 36 and the movable plate containing hole 25. The movable plate containing hole 25 communicates with the sub cavity 45A. The coil spring 23A is disposed in the coil spring containing hole 36 in the state in which one end of the coil spring 23A abuts against the piston 24. The tip 22C of the movable plate 22 projects inward of the sub cavity 45A. The tip 22C of the movable plate 22 exemplifies the sealing portion molding cavity forming member which forms at least a part of the third molding surface recited in claim 3. In the case of the shape, the molten resin J cannot overflow outside from the sub cavity 45A irrespective of the retreat amount in the counter pressing direction in the sealing portion molding step.

FIG. 10 illustrates the state in which the mold is finely opened. Unlike in the first preferred embodiment, there is interposed the communication portion 47 between the sub cavity 45A having the third sub cavity forming surface 32C on the side of the coated surface (the side of the movable mold) and the cavity 40. Here, it is conceptually easy to understand that the communication portion is disposed over the entire circumference. In this state, the pressing direction is identical to that of the parting surface sealing member 55 even if the inner pressure is applied from the side of the coated surface of the molded resin product 50, and therefore, the force for pressing the parting surface sealing member 55 is not at all degraded without deforming the molded resin product 50. Furthermore, the cavity inner pressure exerts in such a direction as to assist or alleviate the pressing force, thereby achieving the secure sealability.

The present invention is not limited to the above-described preferred embodiment, but may be implemented by appropriately modifying a part of the subject matter without departing from the scope of the invention. For example, unlike the first preferred embodiment, the sub cavity forming groove may be formed at the movable plate 22 in place of the movable mold 30 in order to form the sub cavity 45.

Unlike the first preferred embodiment, since the parting surface sealing member 55 is pressed against the sub cavity forming groove 32 and the sub cavity forming surface 28, a mechanism such as a hydraulic cylinder or an electromagnetic cylinder may be appropriately disposed in place of the coil spring 23.

As for the coil spring 23, a spring load is fixed for each of coil springs. In view of this, the coil spring must be replaced with another in order to vary the pressed state of the parting surface sealing member 55 against the sub cavity forming groove 32 and the sub cavity forming surface 28. In contrast, for example, a hydraulic cylinder can optimally adjust a state in which the parting surface sealing member 55 is pressed against the sub cavity forming groove 32 and the sub cavity forming surface 28 by changing a set value of an oil pressure.

Hot water may be allowed to flow in the arm 22B in place of the heater 22D in order to adjust the temperature of the arm 22B in the first preferred embodiment.

Unlike the above-described preferred embodiment, a sprue communicating with the sub cavity 45 (45A) may be disposed independently of the sprue 27 communicating with the cavity 40 without any through portion 47. In this manner, a molten resin different from the molten resin injected to the cavity 40 may be injected to each of the cavities 40 and 45 (45A) independently of the cavity 40.

Unlike the above-described preferred embodiment, a primer treatment agent, an anti-ultraviolet agent or a hard coating agent may be used in place of the thermosetting coating 57.

What is claimed is:

1. An in-mold molded product coating mold, in which a molded resin product is molded by filling a mold cavity formed of a stationary mold and a movable mold with a resin, followed by injecting a coating agent, with which the molded resin product is coated, into the mold cavity, the in-mold molded product coating mold comprising:

a sealing portion molding cavity being positioned outside apart from the mold cavity while including a first molding surface which extends from a parting surface of the mold cavity in a mold mating direction of the stationary mold and the movable mold and is formed at either one of the stationary mold and the movable mold, a second molding surface which extends from the parting surface in a mold opening/closing direction of the mold cavity and is formed at the other of the above-described two molds, and a third molding surface which connects the first molding surface and the second molding surface to each other, and forming a sealing portion for sealing the first molding surface and the second molding surface by filling a resin identical to or different from the above-described resin; and a presser for pressing a pressing surface of the sealing portion defined by the third molding surface under a predetermined pressure, so as to bring the sealing portion into press-contact with the first molding surface and the second molding surface, respectively.

2. The in-mold molded product coating mold of claim 1, wherein the sealing portion molding cavity is positioned around the entire circumference of the mold cavity, and a communicating portion which is formed at either one of the molds to thus communicate between the mold cavity and the sealing portion molding cavity is provided at an arbitrary location of the parting surface formed between the mold cavity and the sealing portion molding cavity; said communicating portion having a required minimum cross-sectional area that is enough to allow the resin to pass therethrough and be filled in the sealing portion molding cavity.

3. The in-mold molded product coating mold of claim 1, wherein the sealing portion molding cavity is positioned around the entire circumference of the mold cavity, and a communicating portion which is formed at either one of the molds to thus communicate between the mold cavity and the sealing portion molding cavity is provided at an arbitrary location of the parting surface formed between the mold cavity and the sealing portion molding cavity; said communicating portion being interposed between the sealing portion molding cavity having the third molding surface at a mold on a coated surface side of the molded resin product and the mold cavity.

4. The in-mold molded product coating mold of claim 1, wherein the presser includes a sealing portion molding cavity forming member which forms at least a part of the third molding surface in a state in which the stationary mold and the movable mold are caulked with each other, is able to press the pressing surface of the sealing portion, is able to advance/retreat in the mold opening/closing direction, and is restricted in retreat amount in a counter-pressing direction by a stopper while being able to advance in a pressing direction following each of molding contraction occurring during a hardening process of the sealing portion and a finely mold opening operation before coating agent injection performed after the molding of the sealing portion; and a pressing mechanism which is located on a side opposite to the side on which the sealing portion molding cavity forming member presses the pressing surface of the sealing portion, for pressing the pressing surface of the sealing portion under the predetermined pressure via the sealing portion molding cavity forming member.

5. The in-mold molded product coating mold of claim 4, wherein the sealing portion molding cavity forming member is a member having two surfaces serving as mating surfaces with respect to a mold mating surface including the first molding surface and a mold opening/closing surface including the second molding surface, the member having the entire third molding surface formed by machining a corner constituted of the two surfaces and being abuttable against the entire pressing surface of the sealing portion, and further, a restriction value retreatable in the counter-pressing direction is set to a predetermined dimension, in which a separation distance between the sealing portion molding cavity forming member and the mold mating surface prevents the resin from flowing outside of the sealing portion molding cavity.

6. The in-mold molded product coating mold of claim 4, wherein the sealing portion molding cavity forming member includes a temperature adjuster for adjusting the temperature of the sealing portion molding cavity forming member.

7. An in-mold molded product coating forming method using an in-mold molded product coating mold, in which a molded resin product is molded by filling a mold cavity formed of a stationary mold and a movable mold with a resin, followed by injecting a coating agent, with which the molded resin product is coated, into the mold cavity, said in-mold molded product coating forming method comprising the steps of:

sealing portion molding, in a sealing portion molding cavity positioned outside apart from the mold cavity while including a first molding surface which extends from a parting surface of the mold cavity in a mold mating direction of the stationary mold and the movable mold and is formed at either one of the stationary mold and the movable mold, a second molding surface which extends from the parting surface in a mold opening/closing direction of the mold cavity and is formed at the other of the above-described two molds, and a third molding surface which connects the first molding surface and the second molding surface to each other, forming a sealing portion which seals the first molding surface and the second molding surface by filling a resin identical to or different from the above-described resin; and pressing a pressing surface of the sealing portion defined by the third molding surface under a predetermined pressure, so as to bring the sealing portion into press-contact with the first molding surface and the second molding surface, respectively.

8. The in-mold molded product coating forming method of claim 7, for allowing a resin to flow in either one of communicating portions by using the in-mold molded product coating mold, wherein the sealing portion molding cavity is positioned around the entire circumference of the mold cavity, and a communicating portion which is formed at either one of the molds to thus communicate between the mold cavity and the sealing portion molding cavity is provided at an arbitrary location of the parting surface formed between the mold cavity and the sealing portion molding cavity; said communicating portion has a required minimum cross-sectional area that is enough to allow the resin to pass therethrough and be filled in the sealing portion molding cavity.

9. The in-mold molded product coating forming method of claim 7, for allowing a resin to flow in either one of communicating portions by using the in-mold molded product coating mold, wherein the sealing portion molding cavity is positioned around the entire circumference of the mold cavity, and a communicating portion which is formed at either one of the molds to thus communicate between the mold cavity and the sealing portion molding cavity is provided at an arbitrary location of the parting surface formed between the mold cavity and the sealing portion molding cavity; said communicating portion is interposed between the sealing portion molding cavity having the third molding surface at a mold on a coated surface side of the molded resin product and the mold cavity.

10. The in-mold molded product coating forming method of claim 7, wherein the sealing portion molding step includes the step of setting the predetermined pressure to a pressure lower than an injection pressure for a resin identical to or different from the above-described resin in a state in which the stationary mold and the movable mold are caulked with each other, and further, filling the sealing portion molding cavity with the resin under the injection pressure, so as to retreat a sealing portion molding cavity forming member which forms at least a part of the third molding surface, can press the pressing surface of the sealing portion and can advance/retreat in the mold opening/closing direction, in the counter-pressing direction to a position restricted by a stopper;

wherein the pressing step includes the steps of molding contraction following pressing for setting the predetermined pressure to a pressure higher than a pressure applied from the mold cavity side until mold clamping pressure holding for fixing the coating material after the injection of the coating agent at the first molding surface and the second molding surface via the sealing portion, and further, pressing the pressing surface of the sealing portion by the sealing portion molding cavity forming member following the molding contraction occurring during a hardening process of the sealing portion; and a finely mold opening following pressing for pressing the pressing surface of the sealing portion by the sealing portion molding cavity forming member following a finely mold opening operation before the coating agent injection performed after the sealing portion molding.

11. The in-mold molded product coating forming method of claim 10, wherein, by using an in-mold molded product coating mold in which the sealing portion molding cavity forming member is a member having two surfaces serving as mating surfaces with respect to a mold mating surface including the first molding surface and a mold opening/closing surface including the second molding surface, the member having the entire third molding surface formed by machining a corner constituted of the two surfaces and being abuttable against the entire pressing surface of the sealing portion, and further, a restriction value retreatable in the counter-pressing direction is set to a predetermined dimension, in which a separation distance between the sealing portion molding cavity forming member and the mold mating surface prevents the resin from flowing outside of the sealing portion molding cavity, wherein the third molding surface is formed in a small size such that a molding contraction amount of the sealing portion in the mold opening/closing direction falls within the predetermined defined dimension, achieving the molding contraction following pressing.

12. The in-mold molded product coating forming method of claim 10, comprising adjusting a temperature of a sealing portion forming member.

* * * * *